Jan. 30, 1923.

A. MITCHELL.
TRACTION LUG.
FILED JULY 12, 1920.

1,443,374

Inventor
A. Mitchell.

By
Lacey & Lacey, Attorneys

Patented Jan. 30, 1923.

1,443,374

UNITED STATES PATENT OFFICE.

ALEXANDER MITCHELL, OF PUEBLO, COLORADO, ASSIGNOR TO THE ALEX MITCHELL MOTOR PLOW COMPANY, A CORPORATION OF COLORADO.

TRACTION LUG.

Application filed July 12, 1920. Serial No. 395,491.

*To all whom it may concern:*

Be it known that I, ALEXANDER MITCHELL, a citizen of the United States, residing at Pueblo, in the county of Pueblo and State of Colorado, have invented certain new and useful Improvements in Traction Lugs, of which the following is a specification.

This invention relates to traction lugs of that type which are designed to be detachably applied to the traction wheels of traction plows, tractors and other similar power driven implements.

One of the primary objects of the invention is to provide a traction lug which may be readily and quickly applied to a wheel adapted for its application and may equally as readily and quickly be detached when it becomes necessary to run the tractor or other implement or machine over paved road or street surfaces so that under working conditions all of the advantages of the lug may be obtained and on the other hand when the tractor or the like is being transported under its own power from place to place the lugs may be removed so as to permit of the travel of the tractor over paved surfaces without any likelihood of injury to such surfaces, thus avoiding infraction of town and city ordinances relating to this class of traffic.

Another important object of the invention is to so construct the lug that when applied to the rim of a traction wheel, it will be securely and rigidly held in place thereon and against accidental displacement or loss and to accomplish this result without the employment of any bolts or other threaded fastenings, separate clamps, or any devices of a similar nature which would require the use of various tools in effecting attachment and detachment of the lug, or which would be liable to become clogged through the accumulation of mud, or which would be liable to become battered or otherwise damaged in the course of travel of the traction wheel.

Another important object of the invention is to provide a traction lug of such contour as to not only effectually prevent spinning or slipping of the traction wheels when being driven over muddy or slippery surfaces but also to prevent skidding or side slipping of the wheels under conditions where one or both wheels are passing over sloping ground. In this connection the invention also contemplates so constructing and positioning the lugs upon the wheel that there will always be some portion of some one lug upon each wheel in engagement with the ground surface.

Still another important object of the invention is to form the lug of such cross sectional contour that when the lug enters the ground there will be no suction created tending to cause the adherence of mud to the lugs and the rim of the wheel and thus impede the progress of the tractor or the like over the ground surface.

Still another object of the invention is to form the lug of such cross sectional shape that the strains imposed upon the lug when the wheels are driven, will be evenly distributed thus obviating breaking off the lugs.

Figure 1:
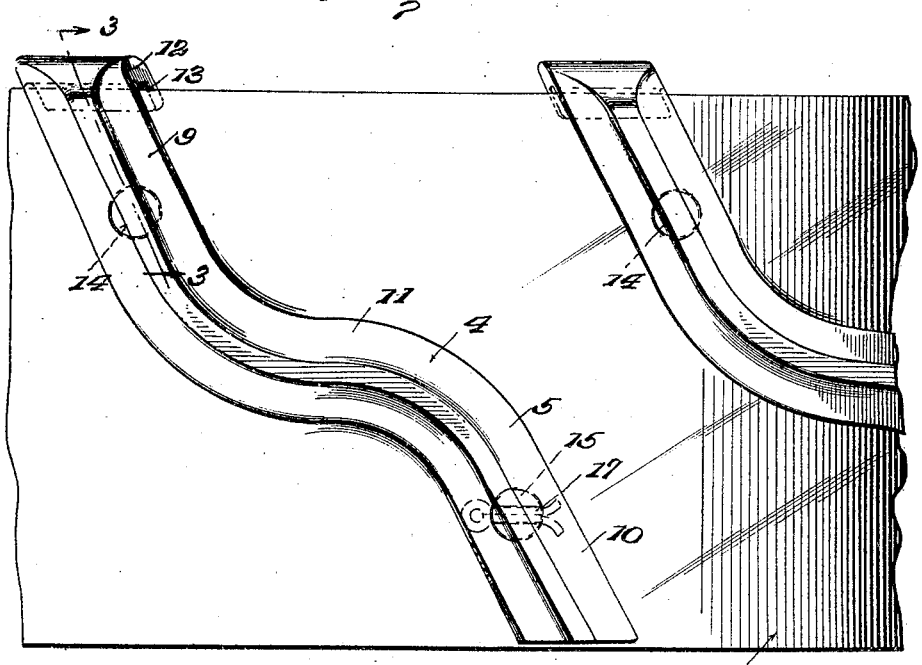
Figure 1 is a plan view of a portion of the rim of a traction wheel illustrating two of the lugs embodying the present invention applied thereto.

In the drawings the numeral 1 indicates in general the rim of a traction wheel which may be that of a tractor, traction plow, or any other similar implement or machine, and this rim, for a purpose to be presently explained, is formed with a circumferential series of pairs of openings, one opening of each pair being indicated by the numeral 2 and the other opening by the numeral 3 and the openings of each pair being disposed in a line oblique to the circumference line of the rim.

The traction lug embodying the present invention is indicated in general by the numeral 4 and the said lug is cast or otherwise formed integral throughout and it is therefore of one piece construction. This lug, generally speaking, comprises a base which is indicated by the numeral 5 and which has its under face, indicated by the numeral 6, cylindrically curved so as to adapt the said face to fit snugly against and conform to the cylindrical surface of the rim 1 when the lug is applied to the rim. This face will be considered as the inner face of the said base 5. The body of the lug is indicated in general by the numeral 7 and the same projects substantially perpendicularly from the outer face of the said base 5 and at its outer edge portion is of uniform thickness but inwardly of this portion is gradually increased in thickness as indicated by the numeral 8 until its side faces merge with the outer surface of the base 5, the said outer faces of the body of the lug being gradually curved in opposite directions toward the juncture of the body of the lug with the base 5 as most clearly shown in Fig. 2 of the drawings.

When the lug is attached, in a manner to be presently explained, to the rim 1 of the wheel, it will extend, generally speaking, obliquely of the rim or, in other words, oblique to the circumference line of the rim, but the lug is of a longitudinal shape other than straight as will be apparent by reference to Fig. 1, and this shape of the lug will now be described, the description having reference to the base of the lug as well as to the body thereof. The lug, generally speaking, has end portions indicated one by the numeral 9 and the other by the numeral 10 which portions extend generally in opposite directions and oblique to the circumference line of the rim 1, and an intermediate portion which is indicated by the numeral 11 and which connects the end portions along curved lines tangent to the lines of extent of the said end portions 9 and 10. However, the curvature of the intermediate portion 11 is of such degree that the ends of this portion merge with the end portions 9 and 10 so that the curvature of substantially one half of the length of the intermediate portion 11 is tangential to the line of extent of the end portion 9 and the curvature of the said intermediate portion 11 throughout the other half of its length is substantial tangential to the line of extent of the end portion 10 thus, under working conditions, the end portions 9 and 10 of the lug will serve to establish traction engagement of the wheel with the ground surface and thus prevent spinning or slipping of the traction wheel when driven by the motive means employed. Due to the peculiar curved disposition of the intermediate portion 11 of the lug, this portion may be said to extend generally speaking in the direction of the circumferential line of the rim 1 so that when the wheel is passing over a sloping surface this portion of the lug will effectually prevent side slipping or skidding. Thus because of the longitudinal shape given the lug, it serves to maintain driving engagement with the ground surface under all working conditions and regardless of whether the ground surface be level or sloping. At this point it is pertinent to note that as illustrated in Figs. 1 and 2 of the drawings the lugs embodying the invention are to be so relatively positioned upon the rim of the wheel that at all times some portion of some one lug will be in engagement with the ground surface so that before any lug is entirely withdrawn from such engagement, the adjacent portion of the next succeeding lug in the series will have been brought into such engagement with the ground surface.

In order that the lug may be securely attached to and anchored upon the rim 1 of the wheel, means are provided which will now be described. The end portion 9 of the lug is formed at its extremity with a portion which is turned inwardly substantially at right angles to the plane of the base 5 of the lug and which is indicated by the numeral 12, and this portion is in turn provided with a lip 13 which projects laterally inwardly substantially at right angles to the said portion 12 and lies in spaced relation to the inner face 6 of the base 5 of the lug as most clearly shown in Figs. 2 and 3 of the drawings. The distance between the lip 13 and the said face 6 of the base 5 of the lug is slightly greater than the thickness of the wheel rim 1 so that the lug may be disposed against the face of the rim with the portion 12 projecting beside one edge of the rim and with the lip 13 engaging beneath the rim at this point. The portions 12 and 13 therefore constitute a somewhat hooked shape anchoring means at one end of the lug engageable with one edge of the wheel rim 1. In order to additionally anchor this end portion of the lug and prevent displacement thereof in a direction circumferentially of the rim 1, it being understood that the locking lip 13 prevents displacement in an outward or radial direction. The base 5 is formed upon its inner face 6 with a stud 14 designed to fit within the opening 2 in the manner clearly shown in Figs. 2 and 3 of the drawings.

Figure 2:
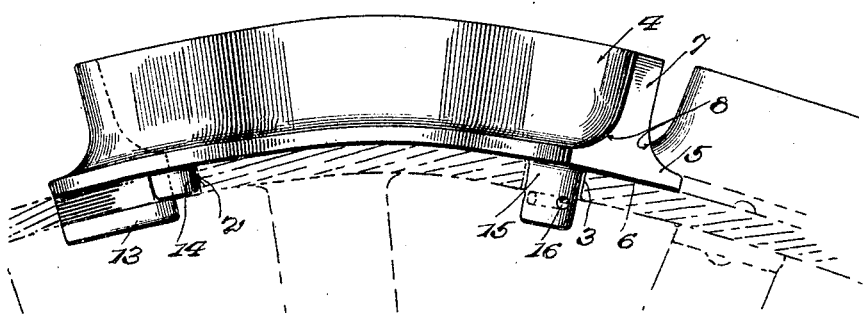
Fig. 2 is a side elevation of the structure shown in Fig. 1, the traction wheel being shown, however, in dotted lines.

In order that the end portion 10 of the lug may be securely anchored and that the lug as a whole may in fact be secured in place upon the rim, this portion of the lug is formed upon the inner face 6 of its base 5 with a stud 15 designed to project or fit through the opening 3 as clearly shown in Fig. 2 of the drawings and to extend a short distance inwardly beyond the inner surface of the rim 1. In this projecting portion of the lug there is formed a diametrical opening 16 through which may be fitted a cotter pin or key indicated by the numeral 17.

Figure 3:
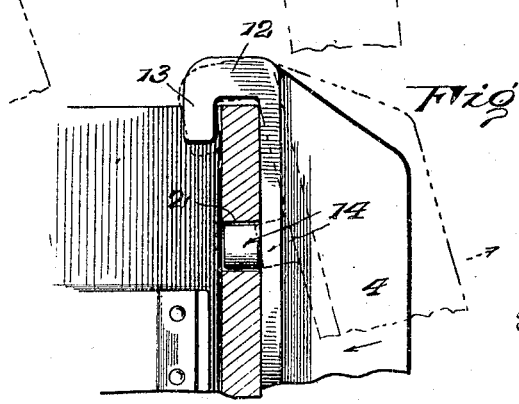
Fig. 3 is a detail transverse sectional view on the line 3—3 of Fig. 1.

The lug having been secured in place upon the rim in the manner generally outlined above, and it being desired to remove the lug, it is only necessary to remove the cotter pin 17 whereupon the end 10 of the lug may be swung or tilted in an outward direction in approximately the manner illustrated in dotted lines in Fig. 3 of the drawings, causing the stud 15 to withdraw from the opening 3 and the stud 14 to withdraw from the opening 2 after which disengagement of the studs from the openings, the lug may be slipped laterally so as to disengage the anchoring member comprising the portion 12 and lip 13 from the edge of the rim. As previously stated the distance between the lip 13 and the base of the lug is slightly greater than the thickness of the rim so that there will be sufficient play to permit of the lug being tilted to the dotted line position as stated above. Of course, in again assembling the lug with the rim it is only necessary to reverse the operation above described and to replace the cotter pin 17 after the lug has been disposed with its base in contact with the face of the rim.

Due to the fact that the side faces 8 of the outstanding body of the lug are curved in opposite directions away from each other and merge with the base 5 at the upper surface of the latter, there will be practically no suction created as the lugs withdraw from a muddy ground surface.

Having thus described the invention, what is claimed as new is:

1. A traction lug comprising a base having relatively offset end portions provided each with a stud for projection through the rim of a wheel, the base being provided at one end with a locking lip for engagement beneath the edge of the wheel rim, the stud nearer the opposite end of the base having a transverse opening for the reception of a securing element to retain the stud in engagement through the rim.

2. A traction lug comprising a base having relatively offset portions each provided with a stud for projection through the rim of a wheel, the base being provided at one end with a locking lip for engagement with the edge of the wheel rim, the stud nearer the lip being relatively short whereby to clear the wheel rim when the lug is rocked about the edge of said rim which is engaged by the said lip, the stud nearer the opposite end of the base being longer than the first mentioned stud whereby to project entirely through said wheel rim and having a transverse opening for the reception of a securing element.

In testimony whereof I affix my signature.

ALEXANDER MITCHELL. [L. S.]